March 31, 1970     G. E. MEDAWAR ET AL     3,503,211

THRUST REVERSER

Filed April 10, 1968     3 Sheets-Sheet 1

INVENTORS
G. E. MEDAWAR
L. HOLMAN
BY George E. Pearson
ATTORNEY

March 31, 1970 G. E. MEDAWAR ET AL 3,503,211

THRUST REVERSER

Filed April 10, 1968 3 Sheets-Sheet 2

INVENTORS.
G. E. MEDAWAR
L. HOLMAN
BY
*George E. Pearson*
ATTORNEY

March 31, 1970 G. E. MEDAWAR ET AL 3,503,211

THRUST REVERSER

Filed April 10, 1968 3 Sheets-Sheet 3

INVENTORS
G. E. MEDAWAR
L. HOLMAN
BY
George Z. Pearson
ATTORNEY

United States Patent Office 3,503,211
Patented Mar. 31, 1970

3,503,211
THRUST REVERSER
George E. Medawar, San Diego, and Leonard Holman, Imperial Beach, Calif., assignors to Rohr Corporation, Chula Vista, Calif., a corporation of California
Filed Apr. 10, 1968, Ser. No. 720,036
Int. Cl. F02k 1/00, 3/02; B64c 15/04
U.S. Cl. 60—229                                                  6 Claims

ABSTRACT OF THE DISCLOSURE

A thrust reverser arrangement for a fan type jet propulsion engine includes a ring of flow reversing cascades which are uncovered when the aft portion of a split cowl for the engine fan is translated rearwardly on a roller and track support to an extended position. During the terminal translational movement of the aft portion, peripherally disposed blocker doors which are pivotally secured to the aft portion are rotated into position to block the fan air and force the same through the cascades. The ring of cascades may be secured to the aft portion for translational movement therewith or, alternatively, may be secured to the forward cowl portion. Track members carried by the forward portion are engaged by rollers carried by the translationally moved members and certain of the rollers carried only by the blockers doors move in a curved portion of the track members to produce the rotational movement of the doors.

BACKGROUND OF THE INVENTION

This invention relates generally to thrust reversers for bypass fan type jet propulsion engines and more particularly to improvements therein.

Various thrust reversers of this type have heretofore been provided in which a translatable fan cowl portion is moved to expose a ring of flow reversing cascades to which the normal fluid flow through the bypass duct is diverted by a plurality of blocker doors or flaps which have been rotated into position to block the bypass duct. While such prior art reversers have been generally suitable for the purposes intended, they have had several structural and functional limitations imposed by the specific structure and combination of parts employed to accomplish the reverse function without compromising any of the aerodynamic characteristics, performance, and functions desired of the engine. For example, it has been considered desirable to provide a reverser capable of interfitting with the aircraft structure as it exists to effect other aerodynamic functions while also being capable of supplying thrust modulation characteristics to provide for immediate and full thrust during a landing operation while also maintaining the engine at its full rotating speed and without changing loading on the fan or gas generator. It further has been considered important that the reverser have a fail-safe characteristic enabling it to retain a specific position, that is, in the event of structural failure, that it will stay in a reverse thrust position while being used as a landing roll reverser, or to return to a fully stowed position while being used for thrust modulation in a cruise position.

SUMMARY OF THE INVENTION

In accordance with the present invention, the thrust reverser hereinafter disclosed and claimed is adapted particularly for use with a jet propulsion powerplant of the front fan bypass type having an engine and a fan concentric therewith and extended radially beyond the wall of the engine. A cowl surrounds the fan and is spaced from the engine wall to provide a bypass duct therewith. The cowl is split into fore and aft abutting cylindrical portions which form inner and outer flow surfaces when closed in cruise position.

A plurality of peripherally disposed and cantilevered beams are secured to the forward cowl portion and extend longitudinally into the aft cowl portion for translational support of the same to an extended position rearwardly of the forward cowl portion to thus develop an annular opening therebetween. A ring of flow reversing cascades is disposed within the region of this opening, and the cascades become fully exposed when the aft cowl portion is moved into its extended position. The ring of cascades may be disposed in stowed position within the forward cowl portion and secured to the aft cowl portion for translational movement therewith, or alternatively, the ring of cascades may be secured to the forward cowl portion.

A plurality of peripherally disposed blocker flaps or doors are pivotally secured to the aft cowl portion and form a part of its inner flow surface when in its cruise position. Tracks formed on the cantilevered beams are engaged by rollers carried by the translationally moved members to support the same for their translational movement, and curved terminal portions of the tracks engage rollers carried only by the doors to effect the aforementioned rotation of the same during the terminal movement of the aft cowl portion. The doors in their extended rotated position engage the engine wall to block the bypass duct and force the normal flow of bypass air to pass through the flow reversing cascades to thus produce the desired reverser thrust.

OBJECTS OF THE INVENTION

An object of the present invention is to provide a new and improved thrust reverser arrangement for bypass type turobjet engines which retains all of the advantages of the prior art reverser of this type.

Another object is to provide a reverser arrangement of this type which may be employed effectively with existing fan engine structures without compromising any of the aerodynamic characteristics desired for other functions of the engine.

Another object is to provide such a reverser arrangement in which the flow reversing cascades are substantially opened before the closing movement of the blocker doors is started thereby to cause only a minimum of interference with the normal operation of the engine during thrust modulation of the reverser.

Another object is to provide such a thrust reverser arrangement in which the ring of flow reversing cascades may either be fixed or translatable with an aft cowl portion of the fan engine which is rendered movable to effect exposure of the cascades.

Another object is to provide such a reverser arrangement in which the translational and rotational movements of the aft cowl portion and blocker doors is effected by simple actuating means which also serve to support these members for their respective movements thereby minimizing the number of elements required for the purpose.

Still another object is to provide a thrust reverser arrangement of the aforedescribed type which is effective in the event of a structural failure to assume a fail-safe position in which the forward thrust performance of the engine is effectively restored.

Still other features, advantages and objects of the present invention are inherent in or to be implied from the novel construction, combination and arrangement of the parts constituting a preferred embodiment of the invention as will become more fully apparent as the description proceeds.

THE SPECIFICATION

Figure 1:
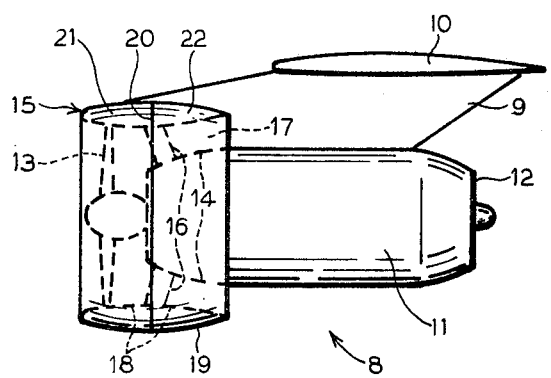
FIG. 1 is a view in elevation of a fan type jet propulsion powerplant supported from an aircraft wing and employing the thrust reverser of the present invention.

Referring now to the drawings for a more complete understanding of the invention, and first more particularly to FIG. 1, a fan type engine generally designated 8 is shown supported by a pylon 9 from an aircraft wing 10. Fan type engine 8 comprises a jet engine 11 which discharges a gaseous effluent through nozzle 12 to provide thrust. In this case, the gas jet thrust is augmented by air flow produced by a fan 13 driven by the engine and disposed concentric with the engine 11 and extended radially beyond the wall 14 thereof. A cowling generally designated 15 is spaced from and supported by suitable struts 16 extended from the engine wall 14 to form a bypass duct 17 for flow of the fan air therebetween.

Figure 2:
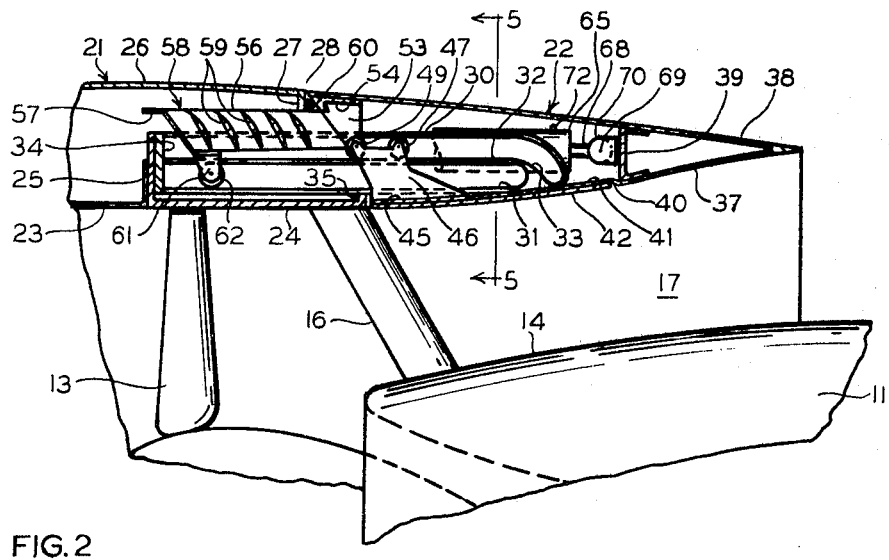
FIG. 2 is an enlarged cross-sectional view of the thrust reverser constructed in accordance with a preferred embodiment thereof and shown in its cruise position.

For purposes of the present invention, and in order to provide a simple, light weight structure for reversing the fan air flow through the bypass duct 17 without compromising the physical characteristics of the engine geometry while also providing a minimum cowling thickness between its inner and outer flow surfaces 18 and 19, respectively, the cowling 15 is used as part of the reverser structure and, to this end, is split along the peripheral line 20 to form a forward cowl portion 21 and an aft cowl portion 22, both portions of which form inner and outer flow surfaces 18 and 19 in the cruise position of the thrust reverser as shown in FIG. 2.

Referring now to FIGS. 2 to 6, the forward cowl portion comprises inner annular cowl plates 23 and 24 which are suitably joined, as by their radially outwardly directed and engaging flanges depicted at 25. Forward cowl portion also comprises an outer annular cowl plate 26 which terminates at its downstream end in an annular ring 27 of right angle cross section ot provide a seat for a sealing ring 28.

Figure 5:
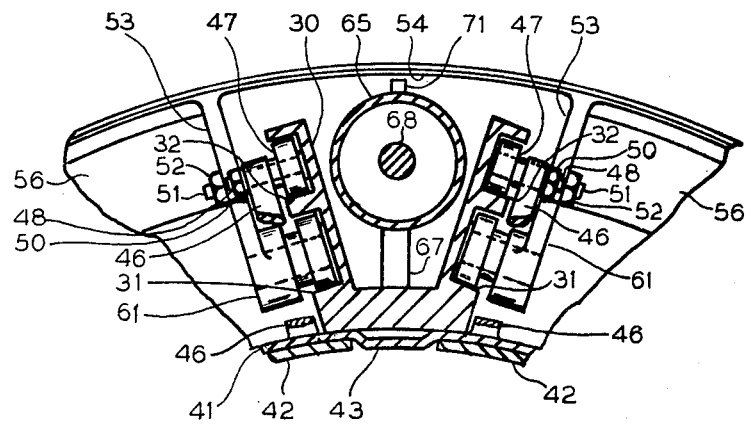
FIG. 5 is a fragmentary sectional view, somewhat enlarged, taken along the line 5—5 of FIG. 2.

A plurality of peripherally disposed and circumferentially spaced cantilever beams 30 are secured at their upstream portions to the forward cowl portion 21 and extend longitudinally therefrom into the aft cowl portion 22. Each beam 30, as best seen in FIG. 5, is generally U-shaped in cross section, each leg of the U, however, being E-shaped in cross section to provide an inner roller track surface 31 and an outer roller track surface 32 which terminates in an inwardly directed arcuate roller track portion 33, FIG. 2, for a purpose subsequently to appear. Each leg of beam 30 terminates at its upstream end in a flange 34, FIGS. 2 and 3, by means of which the beam conveniently is fastened in any suitable manner (not shown) to the engaging cowl flanges depicted at 25. The beams 30 engage and are supported by an outwardly directed terminal flange 35 disposed at the downstream end of inner cowl plate 24 and the beams may also be secured, if desired, to this flange.

Aft cowl portion 22 comprises inner and outer annular cowl plates 37 and 38, respectively, which are joined, as shown, at their downstream ends and further structurally interconnected somewhat upstream therefrom by the annular member 39 which is generally C-shaped in cross section. The upstream portion of inner cowl plate 37 is joggled or offset, as indicated at 40, and thus depressed or recessed in each of a plurality of peripherally disposed areas to respectively provide seats 41, FIGS. 3 to 6, for a plurality of blocker doors or flaps 42 which are pivotally secured to aft cowl portion 22 and nested within these recessed areas when the doors 42 are in their stowed positions as shown in FIGS. 2 and 5.

Figure 4:
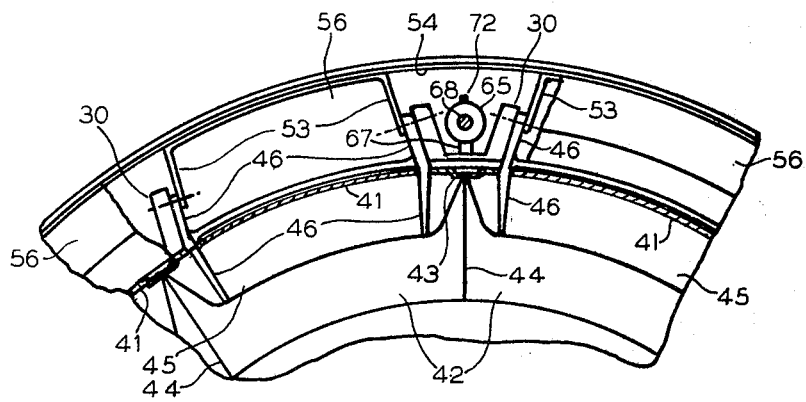
FIG. 4 is a fragmentary sectional view taken along the line 4—4 of FIG. 3.
Figure 6:
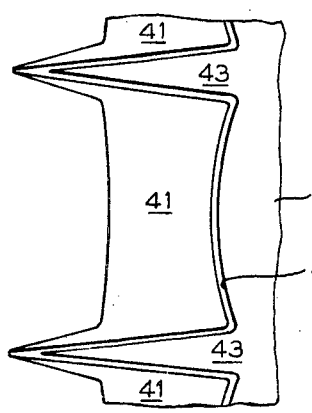
FIG. 6 is a fragmentary view as seen along the line 6—6 of FIG. 3.

The unjoggled or non-offset areas 43 of cowl plate 37, which lie between each adjacent pair of recessed door seat areas 41, FIG. 6, are wedge-shaped, being widest downstream in the region depicted by joggle 40 and being diminished to a point at their upstream ends in order to fill in the gaps between the doors in their stowed position. These gaps result from the fact that the doors in their extended blocking positions, abut or meet along their side edges 44, as best seen in FIG. 4, when moved inwardly to engage the engine wall 14. In this extended position of the doors, the downstream ends of the doors have the same peripheral length as the engine wall in contact therewith, thus, when the doors move to their stowed positions at the greater diameter of the door seats 41, gaps develop between the side edges of the doors and these are filled by the wedge-shaped cowl plate areas 43 to thus provide a smooth inner flow surface through the aft cowl portion 22. Portions of the seat areas 41 may be removed, if desired, to reduce weight.

Each door 42 has a plate 45 suitably secured thereto, and each plate 45 has two spaced, upstanding brackets 46. Each bracket 46 has mounted thereon a first roller 47 which is disposed to move along the longitudinal portion of track 32 of the associated beam 30 and from thence into the arcuate portion 33 of the track, roller 47 having a suitable support shaft or pin 48, FIG. 5, secured by the associated nut 50. Each bracket 46 also has a second roller 49 disposed to engage only the longitudinal portion of track 32 and move therealong, roller 49 similarly having a support shaft or pin 51 secured by the associated nut 52.

Each pivot pin 51 also serves as a hinge pin for pivotally connecting its door 42 to outer cowl plate 38, this being accomplished by use of brackets 53 which extend inwardly from a ring member 54 suitably secured to the inner surface of plate 38 at the upstream end thereof. Each bracket 53 has a bolt 51, aforementioned, secured thereto by its associated nut 52, bolt 51 for this purpose being received pivotally within its associated door bracket 46.

As best seen in FIG. 4, there are two ring brackets 53 associated with each adjacently disposed pair of the cantilevered beams 30, and a plurality of perpherally disposed sections 56 of a cascade ring structure generally designated 58 respectively extend between each of the pairs of these brackets and are suitably secured thereto and to ring member 54. The upstream ends of cascade sections 56 are joined by a ring member 57, FIGS. 2 and 3, which freely passes within angle ring 27 of forward cowl portion 21 to thus clear the usual flow reversing cascades 59 which make up each of the cascade sections 56. The aforementioned sealing ring 28 seated in angle ring 27 is adapted to be engaged by the angled surface 60 of ring 54 of the aft cowl portion 22, thereby to effect a seal between the split cowl portions when in their closed position. In this position, the upstream ends of cowl plate 37 and doors 42 of aft cowl portion 42 abut against flange 35 of the forward cowl portion 21.

A plurality of brackets 61 are secured to the inner surface of cascade ring 58 at the upstream end thereof, there being a pair of such brackets for each case section 56. Each bracket 61 has a roller 62 rotatively supported thereon for engagement with track surface 31 of the associated beam 30.

Figure 3:
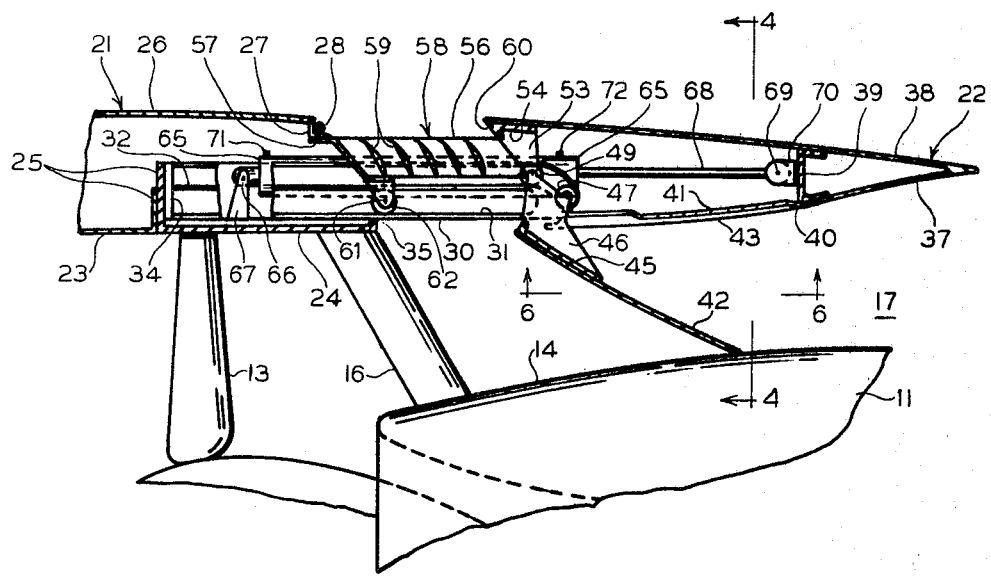
FIG. 3 is a view similar to FIG. 2 and showing the reverser in its reverser thrust position.

A plurality of hydraulic actuators 65 are disposed respectively between the legs of beams 30, and each actuator has the cylinder thereof pivotally connected as depicted at 66, FIG. 3, to a bracket 67, in turn, suitably secured to the base of its associated beam 30, FIGS. 3, 4 and 5. Piston 68 of each actuator 65 is suitably connected pivotally, as depicted at 69, FIGS. 2 and 3, to a bracket 70 which is suitably secured to C-shaped ring 39 of aft cowl portion 22. Each actuator has fluid ports 71 and 72 by means of which the piston may be positioned variably to effect modulations of the movements of the aft portion 22 and its blocker doors, as presently to be described.

In the operation of the reverser embodiment disclosed in FIGS. 1 to 6, assuming first that the parts are in the position disclosed in FIGS. 1, 2 and 5, the split cowl portions are closed together, and the fan air passes unobstructed through the bypass duct 17. When actuators 65 are operated, and it will be understood that they are operated synchronously, aft cowl portion 22, being movably supported by rollers 47, 49 and 62 in engagement with tracks 31 and 32 on beams 30, is translated rearwardly from its stowed position as shown in FIG. 2 to its extended deployed position as shown in FIG. 3. During the terminal portion of this translational movement, that is, from the time that the door support rollers 47 enter their respective curved portions 33 on tracks 32, the doors 42 are caused to rotate about their respective curved portions 33 pivot supports 51 for rollers 49 as rollers 47 follow the curved portions 33 of their respective tracks. At the end of this rotational movement, doors 42 occupy the position depicted in FIGS. 3 and 4 wherein their downstream ends engage the engine wall 14, FIG. 3, and their side edges meet as depicted at 44, FIG. 4, to thus block the fan air which would otherwise pass unobstructed through the bypass duct 17, as in FIG. 2. With the doors in blocking position, however, as in FIG. 3, the bypass duct 17 is closed by the doors and the fan air is blocked thereby and forced outwardly of the cascade ring 58 between the cascades 59 which reverse the air flow and thus direct the same forwardly of the forward aft cowl portion 21.

It will be noted that the longitudinal component of travel of a roller 47 along the curved track portion 33 is short compared to its travel along the longitudinal portion of track 32 and, thus, the cascade ring 58 is substantially opened before the rotational movement of the doors to their blocking position is begun. As otherwise expressed, rotational movement of the doors is deferred until the translational movement of the aft cowl portion reaches its terminal phase. In effect, the opening of the cascades and the blocking of the fan air are caused to occur sequentially, and this sequence also obtains on the reverse movement of the parts, the doors being first moved to stowed position against the seats 41, before substantial closing of the cascades occurs. This is considered important in relieving the engine of back pressure and other undesired affects.

In the event of failure of the hydraulic system when the parts are in the deployed position of FIGS. 3 and 5, the pressure of the fan air on the doors 42 will force the same into their stowed position to thus provide a fail-safe operation. Movement of the door support rollers 47 forwardly of the arcuate track portions 33 drives the aft cowl portion upstream by a small amount as the doors are driven to stowed position; the cascades 59, however, remain largely open.

In some conditions of flight and ground roll control it may be desirable to modulate the extent of opening of the cascades and the extent of closing of the blocker doors. To this end, the flow of fluid to the actuator ports 71 and 72 may be controlled variably to expose a select number of cascades 59 as the same are withdrawn from beneath the covering afforded by the forward cowl portion 21. Likewise, the doors 42 may be positioned selectively to modulate the area of discharge of fan air through the bypass duct 17, this occuring during variably controlled movement of the aft cowl portion during the terminal portion of its translational movement.

Figure 7:
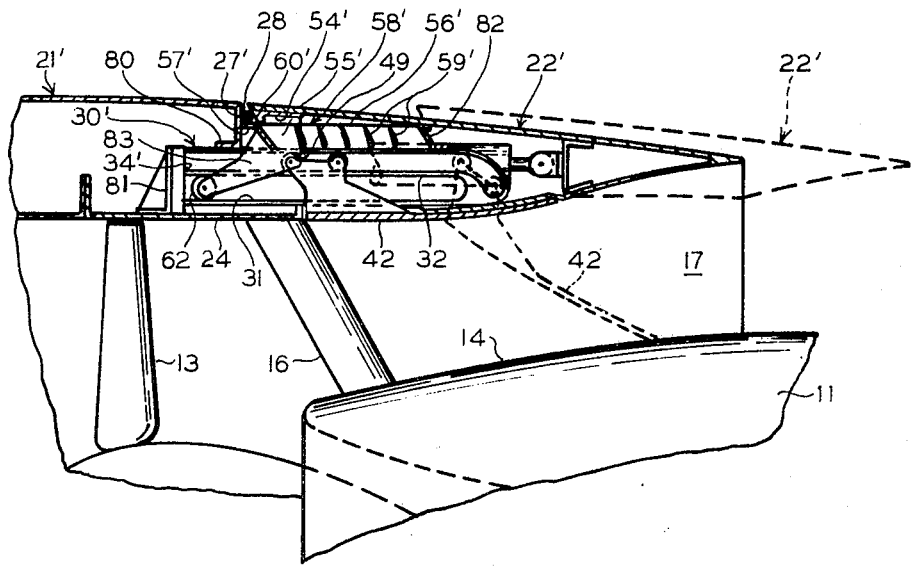
FIG. 7 is a view similar to FIG. 2 and showing the thrust reverser constructed in accordance with an alternative embodiment of the invention.

Reference is now directed to FIG. 7 which discloses a reverser arrangement similar to that disclosed in FIGS. 1 to 6 except that the parts are modified, as hereinafter described, to provide for an arrangement in which the cascade ring 58' is secured to the forward cowl portion 21' and, accordingly, does not translate with the aft cowl portion 22' which together with its doors 42 is otherwise unchanged structurally and functionally.

Forward cowl portions 21' has an angle ring member 27' having a forwardly directed flange 80 which serves to support the cantilever beams 30' which, in the arrangement of FIG. 7, are shortened somewhat and have their end plates 34' secured to a ring bracket 81, in turn, secured to the inner cowl plate 24.

The forward end ring 57' which joins the upstream ends of cascade sections 56', in the arrangement of FIG. 7, is secured to the ring 27', and the downstream ends of the cascade sections 56' are joined by an end ring 82. Channels between the peripherally disposed cascade sections provide clearance for passage of the door support hinge brackets 55' which are carried by the aft cowl ring member 54', as in the arrangement of FIGS. 1 to 6.

Aft cowl portion ring member 54' has an inclined end surface 60' which engages the sealing ring 28 as in the embodiment of FIGS. 1 to 6, ring 28 in the arrangement of FIG. 7 being supported by the cascade end ring 57'. The door support hinge brackets 55' which depend from ring 54' support the hinge rollers 49, as before, for rolling movement along track 32. Brackets 55' in the case of FIG. 7, however, have forwardly extending portions 83 which support rollers 62 for movement along track 31.

The reverse arrangement of FIG. 7 generally operates in the same manner as the reverser embodiment of FIGS. 1 to 6, except that translational movement of the aft cowl portion to its deployed position, as indicated by the dashed lines, progressively uncovers the cascades 59' which in this case are fixed to the forward cowl portion 21', the doors 42 being rotated to their blocking position in the same manner as in the first described embodiment.

From the foregoing it will now be apparent that thrust reverser arrangements have been provided which are well adapted to fulfill the aforestated objects of the invention and that while only two embodiments of the invention have been described for purposes of illustration, it will be apparent that other forms of the invention are possible within the scope of the appended claims. For example, actuators 65 may be located in the forward cowl portion 21 and their actautor rods 68 connected in the arrangement of FIGS. 1 to 6 to the upstream end ring 57 of the translatable cascades, thereby to drive the aft cowl portion 22 rearwardly. In the case of the arrangement of FIG. 7, the actuators 65 similarly may be disposed in the forward cowl portion 21 and their actautor rods 68 connected to ring member 54' of the aft cowl portion 22', thereby to translate the same from the forward cowl portion. In such alternative construction, the cantilever beams may generally be I-shaped in construction with the roller tracks provided on opposite sides of the center leg of the beam, it being apparent also that, if desired, only one track need be used on each side of the beam, it being apparent that roller 62 could be arranged to move along track 32 in the arrangement of FIGS. 1 to 6. It will be apparent, moreover, that the invention is applicable to aft fan powerplants as well as to cruise type fans.

Having thus described the invention, what is claimed and desired to be secured by Letters Patent is:

1. A thrust reverser for a fan type jet propulsion engine having an inner wall and a fan concentric therewith and extended radially beyond said well, comprising, a cowling surrounding said fan and spaced from said wall to form a bypass duct, said cowling being split into abutting forward and aft cowl portions forming inner and outer flow surfaces in cruise position, a ring of flow reversing cascades disposed within said cowling, a plurality of peripherally disposed blocker doors pivoted to said aft cowl portion and forming part of the inner flow surface thereof in cruise position, and actuating means disposed within said cowling and controllably interconnecting said doors and aft cowl portion for translating said aft cowl portion downstream to an extended position for uncovering said cascades and rotating said doors into extended blockin gposition in said duct during the terminal translational movement of the aft portion to said extended blocking position in said duct during the terminal to open the flow areas through the cascades before blocking the flow area through said duct, a plurality of peripherally spaced cantilever beams secured to said forward cowl portion and extended rearwardly into said aft cowl portion, said beams having roller tracks and said aft cowl portion and said doors having rollers in engagement with said tracks for supporting the aft portion and doors for said translational and rotational movements thereof, each of said doors having a pair of upstream and downstream rollers engageable with one of said plurality of beams, each of said beams having a longitudinal track portion engagable by its associated pair of upstream and downstream door rollers, each said longitudinal track portion terminating downstream in an inwardly directed arcuate portion engagable only by the downstream roller of said pair of door rollers whereby each door is rotated about the axis of its upstream roller as its downstream roller moves along said arcuate track portion.

2. A thrust reverser as in claim 1, each of said beams being U-shaped in cross section and having an actuator disposed between the legs thereof and operatively connected to the beam and to said aft cowl portion.

3. A thrust reverser for a fan type jet propulsion engine having an inner wall and a fan concentric therewith and extending radially beyond said wall, comprising, a cowling surrounding said fan and spaced from said wall to form a bypass duct, said cowling being split into abutting forward and aft cowl portions forming inner and outer flow surfaces in cruise position, a ring of flow reversing cascades disposed within said aft portion, a plurality of peripherally disposed blocker doors pivoted at their upstream ends to the upstream end of said aft portion and nested therein to form part of the inner flow surface thereof in cruise position, a plurality of peripherally spaced cantilever beams secured to said forward cowl portion and extended rearwardly into said aft cowl portion, said beams having roller support tracks and said aft cowl portion and said doors having rollers disposed in engagement with said tracks for supporting the aft cowl portion and its doors for translational movement downstream to uncover said cascades, each of said doors having associated with one of said plurality of beams a first roller disposed coaxially with the pivot axis of the door and a second roller having an axis disposed parallel to and downstream from said first roller, each of said beams having a longitudinal track portion engagable by its associated first and second door rollers, each said longitudinal track portion terminating downstream in an inwardly directed arcuate track portion engagable only by said second roller whereby each door is rotated about its pivot axis to an extended blocking position as its second roller moves in said arcuate track portion, and actuator means operatively interconnecting said forward and aft cowl portions to effect said translational and rotational movements of the aft cowl portion and its blocker doors.

4. A thrust reverser as in claim 3 wherein said ring of cascades is disposed within the forward cowl portion and covered thereby in said cruise position, said ring of cascades being secured to the aft cowl portion for translational movement therewith whereby said cascades are exposed as the same are withdrawn from the forward cowl portion, said doors being moved to said blocking position during the terminal translational movement of the cascades hereby the fan air is blocked by the doors and directed through and forwardly by the exposed flow reversing cascades.

5. A thrust reverser as in claim 4 wherein said ring of cascades has roller supports movable along said tracks.

6. A thrust reverser as in claim 3, said ring of cascades being secured to said forward cowl portion and disposed within said aft cowl portion whereby said cascades are exposed when the aft cowl portion is translated rearwardly.

References Cited

UNITED STATES PATENTS

| | | | |
|---|---|---|---|
| 2,950,595 | 8/1960 | Laucher et al. | 239—265.31 |
| 3,036,431 | 5/1962 | Vdolek | 60—229 |
| 3,262,268 | 7/1966 | Beavers | 60—226 |
| 3,262,271 | 7/1966 | Beavers | 60—226 |

MARK M. NEWMAN, Primary Examiner

A. D. HERRMANN, Assistant Examiner

U.S. Cl. X.R.

60—226; 239—265.29, 265.31